United States Patent [19]

Goswami et al.

[11] 4,350,792
[45] Sep. 21, 1982

[54] BLEND OF INTERNALLY PLASTICIZED VINYL CHLORIDE COPOLYMER AND POLYURETHANE ELASTOMER

[75] Inventors: Jagadish C. Goswami, New City, N.Y.; Shridhar V. Parikh, Anderson, S.C.

[73] Assignee: Stauffer Chemical Company, Westport, Conn.

[21] Appl. No.: 16,661

[22] Filed: Mar. 1, 1979

[51] Int. Cl.$^3$ ............................................... C08L 75/06
[52] U.S. Cl. .................................... 525/129; 523/435; 525/123
[58] Field of Search ................. 260/859 PV; 525/129

[56] References Cited

U.S. PATENT DOCUMENTS

| | | | |
|---|---|---|---|
| 2,606,162 | 8/1952 | Coffey | 260/859 R |
| 3,204,013 | 8/1965 | Osborn | 260/859 PV |
| 3,487,126 | 12/1969 | Carter | 260/859 PV |
| 3,819,770 | 6/1974 | Kraft | 260/859 PV |
| 3,882,191 | 5/1975 | Balatoni | 260/859 PV |
| 3,940,802 | 3/1976 | Sako | 260/859 PV |
| 3,984,493 | 10/1976 | Kazama | 260/859 PV |
| 4,049,747 | 9/1977 | Jin | 260/859 PV |
| 4,147,853 | 4/1979 | Goswami et al. | 526/88 |

*Primary Examiner*—Paul Lieberman
*Attorney, Agent, or Firm*—Richard P. Fennelly

[57] ABSTRACT

The blending of small amounts of a polyurethane elastomer with an internally plasticized vinyl chloride copolymer improves the abrasion resistance, elasticity, softness or "hand", and low temperature flexibility of films made from the resulting blend.

4 Claims, No Drawings

BLEND OF INTERNALLY PLASTICIZED VINYL CHLORIDE COPOLYMER AND POLYURETHANE ELASTOMER

BACKGROUND OF THE INVENTION

1. Field of the Invention

The present invention relates to a blend of polymers which is useful in making improved films and which contains an internally plasticized vinyl chloride copolymer.

2. Description of the Prior Art

It is well known to use externally plasticized vinyl chloride films to make "coated fabrics" which, when bonded to a substrate, are useful as upholstery material. Recently, it has been proposed that an internally plasticized vinyl chloride copolymer be substituted for the vinyl chloride polymer and external plasticizer to yield films having a lessened degree of "fogging", due to the absence of migrating external plasticizer, and superior low temperature flexibility. Such internally plasticized films, however, have had a number of shortcomings including: a lessened degree of abrasion resistance, a lessened degree of moisture and gas permeance, and a lessened degree of softness, as compared to conventional externally plasticized films.

SUMMARY OF THE PRESENT INVENTION

The present invention is a blend of internally plasticized vinyl chloride copolymer and a small amount of a thermoplastic polyurethane elastomer to improve various of the physical properties of films formed from the blend as compared to films containing an internally plasticized vinyl chloride copolymer alone. In particular, the abrasion resistance, elasticity, softness or "hand", permeance to gas and moisture, and low temperature flexibility of the films are improved.

DESCRIPTION OF THE PRESENT INVENTION

The blend of the present invention comprises, as one component, a suitable internally plasticized vinyl chloride copolymer. Generally, this copolymer will comprise from about 40% to about 60%, by weight of the blend. The additional components of the blend will be a thermoplastic polyurethane elastomer additive intended for use in the invention, along with conventional heat and light stabilizers, ultraviolet stabilizers, pigments, fillers, dyes, fungicides, and the like, in amounts conventionally used. The blend can be used to make films, which when laminated to a suitable fabric backing, are useful as upholstery material. The term "internally plasticized vinyl chloride copolymer" is intended to encompass those vinyl chloride copolymers which contain a plasticizing comonomer which yields a copolymer having a certain degree of inherent flexibility when suitably compounded and formed into the desired end product, for example, a film.

A preferred internally plasticized copolymer of this type is described in U.S. application Ser. No. 857,051, filed Dec. 5, 1977, which is incorporated herein by reference. This copolymer comprises: (1) from about 50% to about 85%, by weight, vinyl chloride; (2) from about 3% to about 47%, by weight, of a $C_6$-$C_{10}$ alkyl acrylate; and from about 47% to about 3%, by weight, of a bis(hydrocarbyl)vinylphosphonate of the formula:

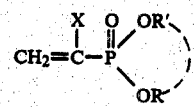

wherein X is selected from the group consisting of hydrogen, halogen, cyano, aryl, such as phenyl, $C_1$-$C_{18}$ alkyl and

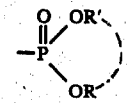

wherein R and R' are hydrocarbyl and substituted hydrocarbyl groups consisting essentially of hydrogen and carbon, and containing up to about 18 carbon atoms, inclusive, with the proviso that R and R' may be the same, different or conjoint, i.e., R and R' may combine to form one single radical.

Preferred weight amounts for the comonomers used to make the copolymer are: (1) from about 55% to about 80%, by weight, vinyl chloride; (2) from about 10% to about 35%, by weight, of the acrylate; and (3) from about 5% to about 25%, by weight of the vinylphosphonate. A particularly preferred acrylate is 2-ethylhexyl acrylate, while particularly preferred vinylphosphonates are bis(beta-chloroethyl)vinylphosphonate and bis(2-ethylhexyl)vinylphosphonate.

The aforementioned internally plasticized copolymer can be formed by conventional bulk, emulsion, suspension, or solution polymerization procedures, although suspension polymerization is preferred.

The thermoplastic polyurethane elastomer which is responsible for the improved physical properties for films made from the blend of the present invention is a well-known material. It is the reaction product of a polymeric polyol (e.g., a polyester glycol or a polyether glycol) with an organic polyisocyanate, usually a diisocyanate, optionally with a low molecular weight bifunctional material having two reactive hydrogens, such as a glycol or diamine. It is preferred that the polyurethane elastomer mainly contains only aliphatic groups so that it possesses both hydrolytic stability as well as ultraviolet light stability. One suitable type of polyurethane elastomer which is useful in the present invention is available under the tradename ULTRAMOLL PU from Mobay Chemical Corporation and has a Shore "A" hardness of from about 69 to about 75 and an average particle size of under 1000 micrometers.

The weight amount of polyurethane elastomer which needs to be used in the blend is relatively small in order to be effective to give the intended improvement in the physical properties for the films formed therefrom. Generally, an amount of polyurethane elastomer ranging from about 5% to about 25%, by weight of the blend will be sufficient. Generally, the amount of internally plasticized copolymer will range from about 40% to about 60%, by weight. The weight ratio of internally plasticized copolymer to polyurethane elastomer will generally be within the range of from about 6:1 to about 2:1. Peferably, the average particle size of the polyurethane should be on the order of 1-5 microns so that it possesses the maximum degree of ease of mixing and compatibility with the internally plasticized copolymer and other additives used in making the film.

The blend containing the type of internally plasticized copolymer described above can be formed into a film after being mixed with additives which are compatible with the polymer and which do not adversely affect the properties of said product to a substantial degree. Included within this class of additives are those heat and light stabilizers, ultraviolet stabilizers, pigments, fillers, dyes, fungicides, and other additives known to persons of ordinary skill in the art. A suitable listing which a person of ordinary skill in the art may use to select appropriate additives is given in Modern Plastics Encyclopedia, Vol. 51, No. 10A, e.g., at pp. 735–754. These additives are used in conventional amounts.

The film can be used to form laminate products which are useful in upholstery applications. These laminates contain a suitable fabric substrate (e.g., woven, non-woven, blends of woven or non-woven, and so forth) attached to the vinyl film (e.g., by means of a plastisol adhesive). The laminates can be formed by any means used to form conventional externally plasticized vinyl film/fabric substrate laminates. Some examples of such procedures include: transfer coating, direct calender lamination, and postlamination.

The present invention is further illustrated by the Examples which follow:

EXAMPLE 1

This Example illustrates the formation of a film from the composition of the present invention. The ingredients listed in the Table which follows were milled together at 157.2° C.–160° C. to form a calenderable composition:

| Ingredient | Amount (Wt. %) |
| --- | --- |
| Internally plasticized copolymer* | 43.0 |
| Thermoplastic polyurethane elastomer (ULTRAMOLL PU) | 20.5 |
| Epoxidized Soya Oil | 3.2 |
| Fumed Silica (CAB-O-SIL M-5) | 0.6 |
| Calcium carbonate filler | 7.9 |
| Magnesium carbonate filler (MAG-CARB-L) | 7.2 |
| Bis-stearamide lubricant (ADVAWAX 240) | 0.6 |
| Partially oxidized polyethylene | 2.1 |
| Zinc heat stabilizer (SYNPRON 1402) | 3.1 |
| Barium/Cadmium heat stabilizer (SYNPRON J86) | 1.0 |
| Antimony oxide flame retardant | 2.1 |
| Phthalate plasticizer | 2.5 |
| Titanium dioxide filler | 6.2 |

*comprises about 75%, by weight, vinyl chloride, about 18%, by weight, 2-ethylhexyl acrylate, and about 7%, by weight, bis(beta-chloroethyl)vinylphosphonate.

The above composition was calendered at a temperature of 160° C. to form a film having a thickness of about from about 6 to 10 mils (152.4 to 254 microns). The films were then laminated to various fabric substrates either using a polyvinyl chloride plastisol adhesive between the film and substrate or by directly laminating the film to the substrate at a temperature of about 76.7° C. The film was then embossed with a suitable grain pattern at a temperature of about 148.0° C. and a pressure of about 2.81 kg/cm².

EXAMPLE 2

This Example illustrates the formation of another film from the composition of the present invention.

The ingredients listed below were mixed and fluxed on a two roll mill having roll temperatures of 160° C. and 162.8° C., respectively, for 20 minutes.

| Ingredient | Amount (wt. %) |
| --- | --- |
| Internally plasticized copolymer* | 52.0 |
| Thermoplastic polyurethane | 10.0 |
| Epoxidized soybean oil | 3.1 |
| Tin mercaptide stabilizer | 0.5 |
| Silica | 0.6 |
| Calcium carbonate filler | 15.8 |
| Magnesium carbonate filler | 7.0 |
| Antimony oxide flame retardant | 2.0 |
| Bis-stearamide lubricant | 0.6 |
| Partially oxidized polyethylene | 1.4 |
| Dilauryl thiodipropionate | 2.0 |
| Pigment/plasticizer mixture** | 5.0 |

*comprises about 60%, by weight, vinyl chloride, about 28% 2-ethylhexyl acrylate, and about 12%, by weight, bis(beta-chloroethyl)vinylphosphonate.
**comprises 56.8%, by weight, pigment and 39.9%, by weight, plasticizer.

Laminated products comprising a film having a thickness of from about 228.6 to about 279.4 microns attached to various substrates were formed by the procedure of Example 1.

EXAMPLE 3

This Example illustrates the formation of another film from the composition of the present invention using the same procedure described in Example 2. The following ingredients were used:

| Ingredient | Amount (Wt. %) |
| --- | --- |
| Internally plasticized copolymer* | 50.0 |
| Thermoplastic polyurethane | 12.0 |
| Epoxidized soybean oil | 3.1 |
| Tin mercaptide stabilizer | 0.5 |
| Silica | 0.6 |
| Calcium carbonate filler | 15.8 |
| Magnesium carbonate filler | 7.0 |
| Antimony oxide flame retardant | 2.0 |
| Bis-stearamide lubricant | 0.6 |
| Partially oxidized polyethylene | 1.4 |
| Dilauryl thiodipropionate | 2.0 |
| Pigment/plasticizer mixture** | 5.0 |

*comprises the same ingredients indicated for Example 2.
**comprises the same ingredients indicated for Example 2.

Laminated products were formed using the same procedure described in Example 2.

EXAMPLE 4

This Example illustrates the formation of another film from the composition of the present invention using the same procedure described in Example 2. The following ingredients were used:

| Ingredient | Amount (Wt. %) |
| --- | --- |
| Internally plasticized copolymer* | 46.0 |
| Thermoplastic polyurethane | 16.0 |
| Epoxidized soybean oil | 3.1 |
| Tin mercaptide stabilizer | 0.5 |
| Silica | 0.6 |
| Calcium carbonate filler | 15.2 |
| Magnesium carbonate filler | 7.0 |
| Antimony oxide flame retardant | 2.0 |
| Bis-stearamide lubricant | 0.6 |
| Partially oxidized polyethylene | 2.0 |
| Dilauryl thiodipropionate | 2.0 |
| Pigment/plasticizer mixture** | 5.0 |

*comprises the same ingredients indicated for Example 2.
**comprises the same ingredients indicated for Example 2.

Laminated products were formed using the same procedure described in Example 2.

EXAMPLE 5

This Example illustrates the formation of another film from the composition of the present invention.

The ingredients listed in the Table which follows were milled and fluxed using the procedure of Example 2:

| Ingredient | Amount (Wt. %) |
| --- | --- |
| Internally plasticized copolymer* | 42.0 |
| Thermoplastic polyurethane | 20.0 |
| Epoxidized soyabean oil | 3.1 |
| Tin mercaptide stabilizer | 0.5 |
| Silica | 0.6 |
| Calcium carbonate filler | 15.2 |
| Magnesium carbonate filler | 7.0 |
| Antimony oxide | 2.0 |
| Bis-stearamide lubricant | 0.6 |
| Partially oxidized polyethylene | 2.0 |
| Dilauryl thiodipropionate | 2.0 |
| Pigment/plasticizer mixture** | 5.0 |

*comprises about 75%, by weight vinyl chloride, about 28%, by weight, 2-ethylhexyl acrylate, and about 7%, by weight, bis(beta-chloroethyl)vinylphosphonate.
**comprises the same ingredients indicated in Example 2.

Film having a thickness of from about 6 to 7 mils (152.4 to 177.8) microns were formed in the mill and were then laminated to a non-woven fabric substrate at a temperature of about 76.7° C. The laminated films were then coated with a thin polyurethane top coat and were then embossed at 148.9° C. and a pressure of 2.81 kg/cm² with an embossing roll having a grain pattern.

EXAMPLE 6

This Example illustrates the Shore "A" hardness for a series of films containing the preferred internally plasticized copolymer of the present invention either with a thermoplastic polyurethane elastomer or with chlorinated polyethylene (CPE).

The ingredients listed below were mixed together at about 160° C. and were formed into a film having a thickness of about 6350 microns.

| Ingredient | Amount (Wt. %) |
| --- | --- |
| Internally plasticized resin + polyurethane or CPE | 62.0 |
| Calcium carbonate filler | 15.8 |
| Magnesium carbonate filler | 7.0 |
| Pigment/plasticizer mixture | 5.0 |
| Epoxidized soyabean oil | 3.1 |
| Antimony oxide | 2.0 |
| Dilauryl thiodipropionate | 2.0 |
| Partially oxidized polyethylene | 1.4 |
| Bis stearamide lubricant | 0.6 |
| Silica | 0.6 |
| Tin mercaptide stabilizer | 0.5 |

The Table given below sets forth the Shore "A" hardness for various resin/polyurethane/CPE blends. The percentages given in the Table are the percent by weight of the resin, polyurethane and/or chlorinated polyethylene based on the total weight of the above-described formulation. The following abbreviations were used:

IPR-1 = a terpolymer of about 60% by weight, vinyl chloride, about 28%, by weight, 2-ethylhexyl acrylate, and about 12%, by weight, bis(beta-chloroethyl)vinylphosphonate.

IPR-2 = a terpolymer of about 75%, by weight, vinyl chloride, about 18%, by weight, 2-ethylhexyl acrylate, and about 7%, by weight, bis(beta-chloroethyl)vinylphosphonate. This is a harder resin than IPR-1.

CPE = chlorinated polyethylene resin having a chlorine content of about 42% and a melt viscosity of about 11,000 poises (XO 2243.46 from Dow Chemical).

Polyurethane = thermoplastic polyurethane elastomer available as ULTRAMOLL PU from Mobay Chemical Corporation.

| Resin | CPE | Polyurethane | Shore "A" Hardness |
| --- | --- | --- | --- |
| 62% IPR-1 | None | None | 76 |
| 50% IPR-1 | 12% | None | 74 |
| 50% IPR-1 | None | 12% | 59 |
| 46% IPR-1 | None | 16% | 54 |
| 44% IPR-1 | None | 18% | 52 |
| 42% IPR-2 | None | 20% | 69 |

These data illustrate the superior softening effects for the thermoplastic polyurethane as compared to those demonstrated when chlorinated polyethylene is used.

The foregoing Examples illustrate certain preferred embodiments of the present invention and should not be construed in a limiting sense. The scope of protection which is sought is set forth in the claims which follow.

We claim:

1. A film-forming blend containing from about 40% to about 60%, by weight of the blend, of an internally plasticized vinyl chloride copolymer, which copolymer comprises from about 50% to about 85%, by weight, vinyl chloride, from about 3% to about 47%, by weight, of a $C_6$–$C_{10}$ alkyl acrylate, and from about 47% to about 3%, by weight, of a bis(hydrocarbyl) vinylphosphonate, and from about 5% to about 25%, by weight of the blend, of a thermoplastic polyurethane elastomer to improve the physical properties of a film formed therefrom.

2. A blend as claimed in claim 1 wherein the weight ratio of internally plasticized copolymer to polyurethane elastomer ranges from about 6:1 to about 2:1.

3. A blend as claimed in claim 2 wherein the internally plasticized copolymer comprises from about 40% to about 60%, by weight, of the blend, and the polymer comprises from about 50% to about 85%, by weight, vinyl chloride, from about 3% to 47%, by weight, of a $C_6$–$C_{10}$ alkyl acrylate, and from about 47% to about 3%, by weight, of a bis(hydrocarbyl)vinylphosphonate.

4. A film formed from the blend of either claim 1 or 2 or 3.

* * * * *